United States Patent
Hunt et al.

(10) Patent No.: US 6,369,128 B1
(45) Date of Patent: *Apr. 9, 2002

(54) AQUEOUS INK COMPOSITION

(75) Inventors: Michael O. Hunt, Greenville; Steven E. Brown, Spartanburg; Robert L. Mahaffey, Spartanburg; Leonard L. Starks, Spartanburg, all of SC (US)

(73) Assignee: Milliken & Company, Spartanburg, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/798,409

(22) Filed: Feb. 7, 1997

(51) Int. Cl.$^7$ ............................................. C09D 11/10
(52) U.S. Cl. ...................... 523/161; 524/377; 106/37.27; 260/DIG. 38
(58) Field of Search .................. 523/161; 260/DIG. 38; 106/31.27; 524/377

(56) References Cited

U.S. PATENT DOCUMENTS

| | | | |
|---|---|---|---|
| 3,157,633 A | 11/1964 | Kuhn | 534/729 |
| 3,929,406 A | 12/1975 | Farmer et al. | 8/403 |
| 4,014,833 A | 3/1977 | Story | 524/377 |
| 4,091,034 A | 5/1978 | Kuhn | 552/109 |
| 4,113,721 A | 9/1978 | Hauser et al. | 534/729 |
| 4,137,083 A | 1/1979 | Hedrick | 524/251 |
| 4,141,684 A | 2/1979 | Kuhn | 8/39 R |
| 4,167,510 A | 9/1979 | Brendle | 534/729 |
| 4,173,554 A | 11/1979 | Sulzberg | 524/211 |
| 4,284,729 A | 8/1981 | Cross et al. | 521/158 |
| 4,732,570 A | 3/1988 | Baumgartner et al. | 8/506 |
| 4,751,254 A | 6/1988 | Kluger et al. | 521/163 |
| 4,778,742 A | 10/1988 | Ong et al. | 430/106 |
| 4,812,141 A | 3/1989 | Baumgartner et al. | 8/506 |
| 4,836,851 A | 6/1989 | Pawlowski et al. | 106/31.58 |
| 4,981,516 A | 1/1991 | Kluger et al. | 106/31.32 |
| 4,990,187 A | 2/1991 | Dien et al. | 106/31.72 |
| 5,000,792 A | 3/1991 | Ohta et al. | 106/499 |
| 5,034,063 A | 7/1991 | Suzuki et al. | 106/496 |
| 5,043,013 A | 8/1991 | Kluger et al. | 106/31.32 |
| 5,051,131 A | 9/1991 | Yuasa et al. | 106/494 |
| 5,059,244 A | 10/1991 | King et al. | 106/31.32 |
| 5,098,478 A | 3/1992 | Krishnan et al. | 106/31.89 |
| 5,176,745 A | 1/1993 | Moore et al. | 106/31.27 |
| 5,230,733 A | 7/1993 | Pawlowski | 525/61 |
| 5,275,647 A | 1/1994 | Winnik | 106/31.59 |
| 5,290,921 A | 3/1994 | Moody et al. | 534/607 |
| 5,310,877 A | 5/1994 | Moore et al. | 530/364 |
| 5,324,354 A | 6/1994 | Jesse et al. | 106/413 |
| 5,387,745 A | 2/1995 | Brendle | 504/116 |
| 5,429,841 A | 7/1995 | Batlaw et al. | 427/288 |
| 5,456,725 A | 10/1995 | Bruhnke | 8/403 |
| 5,536,761 A | 7/1996 | Fujita | 523/160 |

FOREIGN PATENT DOCUMENTS

| | | | | |
|---|---|---|---|---|
| EP | 0 723 999 A1 | 7/1996 | ........... | C09D/11/00 |
| JP | 07310039 | 11/1995 | | |
| JP | 07331148 | 12/1995 | | |
| JP | 0834939 | 2/1996 | | |

*Primary Examiner*—Blaine Copenheaver
*Assistant Examiner*—John J. Guarriello
(74) *Attorney, Agent, or Firm*—Terry T. Moyer; Timothy J. Monahan

(57) ABSTRACT

An aqueous ink composition is provided having an aqueous solvent, a poly(oxyalkylene) substituted organic colorant dissolved in the solvent and a film forming, acrylic polymer or copolymer binder.

15 Claims, No Drawings

AQUEOUS INK COMPOSITION

BACKGROUND OF THE INVENTION

This invention relates to an aqueous ink composition containing a water soluble, poly(oxyalkylene) substituted colorant and a water soluble polymer or latex binder. The ink composition is water resistant once it is applied to a substrate and dried.

Water soluble, poly(oxyalkylene) substituted organic chromophores are known in the art for use as fugitive tints, as disclosed in Kuhn U.S. Pat. No. 3,157,633 for textile fibers; and Brendle U.S. Pat. No. 5,387,745 for agricultural chemicals. The poly(oxyalkylene) substituted colorants have also found utility for use in washable inks as exemplified by Kluger et al. U.S. Pat. No. 4,981,516 and Kluger et al. U.S. Pat. No. 5,043,013.

For some applications, it has been desirable to limit the water solubility of the poly(oxyalkylene) substituted colorants by incorporating a relatively high proportion of propylene oxide and/or butylene oxide adducts in the poly(oxyalkylene) substituent, as shown in Kuhn U.S. Pat. No. 4,091,034 and Hauser et al. U.S. Pat. No. 4,113,721. Inks made by dissolving a thermoplastic resin in an organic solvent and blending in a poly(oxyalkylene) substituted colorant are exemplified in Baumgartner U.S. Pat. No. 4,812,141. Alternatively, the solubility of the poly(oxyalkylene) substituted colorants may be modified by an ester cap, as disclosed in Brendle U.S. Pat. No. 4,167,510.

An aqueous ink composition containing a poly(oxyalkylene) substituted colorant is disclosed in Moore et al. U.S. Pat. No. 5,176,745. The poly(oxyalkylene) substituent is esterfied, with, for example, a cyclic acid anhydride, to provide a terminal carboxylic acid group. A counter ion is present in the ink composition to solubilize the colorant. Aqueous ink compositions having an anionic dye which is solubilized by a volatile alkali component is disclosed in Fujita, U.S. Pat. No. 5,536,761.

SUMMARY OF THE INVENTION

Therefore, the objects of the invention include providing an aqueous based ink composition; an ink composition having a water soluble colorant; an ink composition which is water resistant once applied to a substrate; an ink composition having an aqueous based binder; and an ink composition with little or no volatile organic compounds (VOC's).

Accordingly, an ink composition is provided having an aqueous solvent with an organic colorant dissolved in the solvent and a binder which is either (i) an alkali soluble acrylic polymer or copolymer dissolved in the solvent, or (ii) a polymer latex suspended in the solvent. The organic colorant has one or more poly(oxyalkylene) substituents, but is free from any metal salts of a carboxylic or sulfonic acid substituent. Preferably, the colorant is free from any carboxylic or sulfonic acid substituents, or their salts.

The poly(oxyalkylene) substituent enhances the water solubility of the colorant, when the colorant is dissolved in the aqueous composition. Without being bound to a particular theory, it is believed that the colorant, which has a relatively higher molecular weight and linear structure by virtue of the poly(oxyalkylene) substituent, is immobilized by the binder when the ink is applied to a substrate and dried. By avoiding water solubilizing substituents on the colorant, such as metal salts of carboxylic and sulfonic acid groups, one further improves the bleed resistance of the ink.

DETAILED DESCRIPTION OF THE INVENTION

Without limiting the scope of the invention, the preferred embodiments and features are hereinafter set forth. Unless otherwise indicated, all parts and percentages are by weight and conditions are ambient, i.e. one atmosphere of pressure and 25° C. Unless otherwise specified, aliphatic hydrocarbons and radicals thereof are from one to twelve carbon atoms in length.

All of the United States patents cited in the specification are hereby incorporated by reference.

The ink composition is comprised of an aqueous solvent, a colorant dissolved in the solvent and a binder dissolved or suspended in the solvent. The aqueous solvent may include a water miscible organic co-solvent, such as $C_{1-8}$ alcohols, glycol ethyl ether e.g. Cellosolve™ and acetates. Preferably, the organic co-solvent is less than 10 wt % of the aqueous solvent, most preferably less than 1% of the aqueous solvent. In applications where it is desirable to minimize VOC's, the ink composition can be provided without an organic co-solvent.

The colorant is a poly(oxyalkylene) substituted organic chromophore, which is free from metal salts of a carboxylic or sulfonic acid substituent. For example, the colorant does not contain carboxylic or sulfonic acid substituents in the form of a metal salt with alkali metals, alkaline earth metals or zinc. In a preferred embodiment of the invention, the colorant is free from any carboxylic or sulfonic acid substituents, whether in the form of an acid or salt. Most preferably, the colorant is free from any anionic substituents which render the colorant water insoluble when the anionic substituent is in the acid form and water soluble when it forms a salt. The colorant is dissolved in the aqueous solvent and, is preferably water soluble, defined herein as a minimun solubility of 1 part per 100 parts of water, and preferably the colorant has a minimum solubility of 5 parts per 100 parts of water.

A wide variety of organic chromophores are suitable for use in the present invention. Examples of useful chromophores include: nitroso, nitro, azo and polyazo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine and indigoid chromophore groups. Of particular interest are azo, methine, triarylmethane and anthraquinone chromophore groups.

One or more poly(oxyalkylene) substituents are covalently bonded to the organic chromophore. The poly(oxyalkylene) substituent may be characterized as a straight or branched chain of from 2 to 200 residues of $C_2$–$C_4$ alkylene oxides. In a preferred embodiment, the poly(oxyalkylene) substituents are primarily comprised of from 3 to 100, most preferably 4 to 50 residues of ethylene oxide, propylene oxide or random and block copolymers thereof. Minor amounts of glycidol, butylene oxide and other compatible monomers may also be incorporated into the substituent. For example, glycidol monomers may be incorporated into the poly(oxyalkylene) substituent to promote branching. When enhanced branching is desired, preferably from 2 to 10 glycidol units are provided per poly(oxyalkylene) chain. The water solubility of the colorant is enhanced by providing a poly(oxyalkylene) substituent having 35% or more, preferably 50% or more, most preferably 75% or more ethylene oxide residues relative to the total number of alkylene oxide residues.

The chromogen is covalently bonded to the poly(oxyalkylene) substituent by a linking group, for example by a group selected from N, NR, O, S, $S_2$, $SO_2N$, $SO_2NR$, $CO_2$, CON or CONR, where R is H, $C_1$–$C_{12}$ alkyl, phenyl or benzyl. Preferably, the linking group is N, NR, O, $SO_2N$ or $SO_2NR$. Two poly(oxyalkylene) substituents may be bonded to the chromophore through a trivalent linking group. The number of poly(oxyalkylene) chains per chromophore may be from 1 to 6, preferably 1 to 4, most preferably 1, 2 or 3.

The precise identity of the terminal group of the poly (oxyalkylene) substituent is not believed to be critical, insofar as the functioning of the colorant is concerned, but may have an affect on solubility. By way of example, the end group may be selected from thio, hydroxyl and amine groups, or may be ester, amide or hydroxyl capped, provided that the terminal group of the poly(oxyalkylene) substituent is not a carboxylic or sulfonic acid or salt thereof. Preferably, the poly(oxyalkylene) substituent has a hydroxyl or amine terminal group.

Synthesis of organic chromophores containing poly (oxyalkylene) substituents are disclosed in Kuhn U.S. Pat. No. 3,157,633, Brendle U.S. Pat. No. 4,167,510, Cross et al. U.S. Pat. No. 4,284,729, Baumgartner et al. U.S. Pat. No. 4,732,570 and Moody et al. U.S. Pat. No. 5,290,921.

The binder is a polymer which will form a continuous film upon drying. In general, useful polymers herein have a number average molecular weight of 1,000 or greater. Particularly useful are polymers which are water soluble at alkaline pH, preferably a pH of 8 or greater. By way of example, copolymers of acrylic acid, methacrylic acid and/ or maleic anhydride may be employed. Examples of co-monomers include vinyl or vinylidene containing monomers, such as styrene and esters of acrylic acid and methacrylic acid, especially $C_{1-12}$ alkyl esters of such acids.

The binder may be solubilized by providing a sufficient concentration of a cationic counter ion in the solution and converting pendant acid groups of the polymer into their salts. Examples of counter ions include alkali metal ions, alkaline earth metal ions, zinc ammonium complexes such as Zinplex 15™ marketed by Ultra Additives, Inc., Patterson, N.J., ammonium ions and amine salts such as salts of morpholine. Especially useful are ammonium ions which may optionally be substituted with from one to three groups selected from $C_{1-18}$ alkyl, $C_{2-18}$ hydroxyalkyl, phenyl and alkylphenyl wherein the alkyl portion is $C_{1-4}$, such as amine salts of ethanolamine, diethanolamine and triethanolamine. Preferably, the counter ion is volatile, that is, has a boiling point of 300° C. or less, preferably 100° C. or less. After the counter ion evaporates, the binder becomes substantially water insoluble.

Alternatively, the binder may be a polymer latex, especially a latex formed by emulsion polymerization, as is known to those skilled in the art. Generally, the latex is in the form of a suspension of polymer particles ranging in size from about 0.1 microns to 1.0 microns, at a concentration of about 30 to 60 wt % solids in water. The latices are dilutable in the aqueous solvent of the ink composition. Examples of useful latices include: acrylate and methacrylate ester copolymers, vinyl acetate copolymers, styrene-butadiene copolymers, butadiene and acrylonitrile copolymers, copolymers of butadiene with styrene and acrylonitrile, vinyl and vinylidene chloride copolymers, ethylene copolymers, fluorinated copolymers, acrylamide copolymers and styrene-acrolein copolymers. The latices may also include carboxylated monomers such as methacrylic and acrylic acids. Preferably, the latices are selected from copolymers and terpolymers of monomers selected from styrene, methacrylate and acrylate esters, and methacrylic and acrylic acid.

The term "copolymer" is used in its broad sense to include polymer containing two or more different monomer units, such as terpolymers.

Also within the scope of the present invention is to combine a water soluble polymer with a polymer latex in the aqueous composition. Thus, the binder component of the composition may contain any combination of the aforementioned types of binders.

The relative ratios of the aqueous solvent, poly (oxyalkylene) substituted organic colorant and binder may vary depending upon the application. The formulation of printing inks and their use is well known in the art and is described in detail in *The PrintingInk Manual,* 4th edition, edited by Dr. R.H. Leach, et al. (1988). The ink composition of the present invention is particularly useful in the fields of flexographic printing and gravure printing. For example, aqueous inks having the following compositions may be employed: aqueous solvent: 5 to 70 wt %; colorant: 0.5 to 50 wt %; and binder: 10 to 80 wt %. Preferably, the aqueous ink has the following composition: aqueous solvent: 10 to 70 wt %; colorant: 0.5 to 10 wt %; and binder: 20 to 70 wt %.

In addition to the solvent, colorant and binder, the ink composition may contain one or more of the following additives: thickening agents, defoamers, surfactants, stabilizers, catalysts, anti-oxidants, corrosion inhibitors, biocides and deodorants, as well as plasticizers and waxes to enhance performance. The composition may also contain minor amounts of dyes and pigments added, for example, to adjust the shade. Typically, these additives are present at a concentration of less than 5 wt % of the ink composition, more typically less than 1 wt %.

The composition of the present invention may also be employed in ink jet printing and writing instruments, for example, felt tipped markers and ball point pens. Regardless of the method of application, once the composition is applied to a paper substrate and dried, an ink film is formed, comprising the binder having the colorant uniformly distributed throughout.

The invention may be further understood by reference to the following examples.

EXAMPLE 1

A mixture of 5.5 parts of a violet triphenylmethane based colorant consisting of 73.5 wt. % ethylene oxide polymer described in Example 2 of U.S. Pat. No. 5,043,013, 34.4 parts of alkali soluble acrylate copolymer (S. C. Johnson Joncryl 60™), 0.4 parts of ethoxylated fatty acid (Witco Bubble Breaker 625™), 0.1 parts of hydroxyethyl cellulose, and 59.6 parts of water was blended with good agitation to prepare a blue ink.

The ink composition was printed on 20 wt. white wove paper stock using a Comco Captain™ flexographic printing press. The ink composition was also printed on coated and uncoated catalog paper using a Testing Machines Inc. (TMI) K-Proofer™. The dry printed images showed good water resistance upon holding under running water.

EXAMPLE 2

A mixture of 7.45 parts of the violet triphenylmethane colorant used in Example 1, 78.4 parts of a styrene-acrylate emulsion copolymer (Sequa Sequabond VS-9810™), and 0.4 parts of ethoxylated fatty acid (Witco Bubble Breaker 625™), and 13.75 parts of water was blended with good agitation to form a blue ink with good water resistance.

The ink composition was printed on 20 wt. white wove paper stock using a Comco Captain™ flexographic printing press. The dry printed images showed good water resistance upon holding under running water.

EXAMPLE 3

A mixture of 7.5 parts of a red azo colorant consisting of 61.0 wt. % ethylene oxide polymer described in U.S. Pat. No. 4,751,254 Example 5 with the difference that a 20 EO meta-toluidine derivative was used, 16.5 parts of alkali soluble acrylate copolymer (S. C. Johnson Joncryl 60™), 66.1 parts of styrene-acrylate emulsion copolymer (Sequa Sequabond VS-9810™), 0.4 parts of ethoxylated fatty acid (Witco Bubble Breaker 625™), and 9.5 parts of water was blended to give a red ink with good water resistance and high gloss.

The ink was drawn-down on 20 wt. white wove paper stock, and the resulting dried image was water resistant. The ink composition was also printed on coated and uncoated catalog paper using a Testing Machines, Inc. (TMI) K-Proofer™, and the resulting dried images were water resistant.

EXAMPLE 4

A mixture of 11.0 parts of the violet triphenylmethane based colorant as described in Example 1, 22.5 parts of alkali soluble acrylate copolymer (S. C. Johnson Joncryl 60™), and 66.5 parts of water was blended with good agitation to prepare a blue ink for ink jet applications. The ink had a viscosity of 4.25 centipoise and was applied to paper using a modified ink jet cartridge in a Hewlett-Packard 500™ ink jet printer.

There are, of course, many alternate embodiments and modifications of the present invention which are intended to be included within the scope of the following claims.

What we claim is:

1. An aqueous based ink composition, comprising
   (a) an aqueous solvent, provided that the aqueous solvent contains less than 10 wt. % of an organic solvent;
   (b) an organic colorant dissolved in the solvent, wherein the colorant has a poly(oxyalkylene) substituent, provided that (i) the colorant does not have any substituents of metal salts of carboxylic and sulfonic acid groups; and (ii) the poly(oxyalkylene) substituent is not terminated by a carboxylic or sulfonic acid group or salt thereof; and
   (c) a film forming binder selected from the group consisting of (i) alkali soluble acrylic polymers and copolymers, provided that the aqueous solvent has an alkaline pH; and (ii) polymer latices made by emulsion polymerization, forming a suspension with the solvent.

2. The composition of claim 1 wherein the poly (oxyalkylene) substituent is a straight or branched chain of from 2 to 200 residues of $C_2$–$C_4$ alkylene oxides and wherein 35% or greater of the alkylene oxide residues comprising the poly(oxyalkylene) substituent are ethylene oxide residues.

3. The composition of claim 2 wherein the total number of alkylene oxide residues per poly(oxyalkylene) substituent is from 3 to 100.

4. The composition of claim 3 wherein the poly (oxyalkylene) substituent has a terminal group selected from the group consisting of hydroxyl and amine groups.

5. The composition of claim 2 wherein the poly (oxyalkylene) substituent is comprised of from 4 to 50 alkylene oxide residues selected from the group consisting of ethylene oxide and propylene oxide residues and the colorant has from 1 to 4 poly(oxyalkylene) substituents.

6. The composition of claim 1 wherein the colorant is free from any carboxylic or sulfonic acid groups or salts thereof and the binder is selected from the group consisting of (i) alkali soluble acrylic polymers and copolymers provided that the aqueous solvent has an alkaline pH; and (ii) polymer latices selected from copolymers and terpolymers of styrene, methacrylate and acrylate esters, and methacrylic and acrylic acid.

7. The composition of claim 6 wherein the poly (oxyalkylene) substituent is a straight or branched chain of from 2 to 200 residues of $C_2$–$C_4$ alkylene oxides and wherein 50% or greater of the alkylene oxide residues comprising the poly(oxyalkylene) substituent are ethylene oxide residues and less than 10 wt. % of the aqueous solvent comprises a water miscible, organic co-solvent.

8. The composition of claim 7 wherein the binder is a water soluble acrylic polymer or copolymer and the composition further comprises a volatile, cationic counter ion.

9. The composition of claim 6 wherein the poly (oxyalkylene) substituent is a straight or branched chain of from 2 to 200 residues of $C_2$–$C_4$ alkylene oxides and wherein less than 1 wt. % of the aqueous solvent comprises a water miscible, organic co-solvent and 75% or greater of the alkylene oxide residues comprising the poly (oxyalkylene) substituent are ethylene oxide residues.

10. The composition of claim 9 wherein the total number of alkylene oxide residues per poly(oxyalkylene) substituent is from 3 to 100, the colorant has from 1 to 4 poly (oxyalkylene) substituents and the poly(oxyalkylene) substituents have a terminal group selected from the group consisting of hydroxyl and amine groups.

11. An aqueous based ink composition, comprising
    (a) from 10 to 70 wt. % of an aqueous solvent, provided that the aqueous solvent contains less than 10 wt. % of an organic solvent;
    (b) from 0.5 to 15 wt. % of an organic colorant dissolved in the solvent, wherein the colorant has a poly (oxyalkylene) substituent and the colorant does not have any substituents of carboxylic and sulfonic acid groups and salts thereof; and
    (c) from 20 to 70 wt. % of a film forming binder selected from the group consisting of (i) alkali soluble acrylic polymers and copolymers, provided that the aqueous solvent has an alkaline pH; and (ii) acrylate and methacrylate ester copolymer, vinyl acetate copolymer, styrene-butadiene copolymer, butadiene and acrylonitrile copolymer, copolymers of butadiene with styrene and acrylonitrile, vinyl and vinylidene chloride copolymer, ethylene copolymer, fluorinated copolymer, acrylamide copolymer and styrene-acrolein copolymer latices made by emulsion polymerization, forming a suspension with the solvent.

12. The composition of claim 11 wherein 35% or greater of the alkylene oxide residues comprising the poly (oxyalkylene) substituent are ethylene oxide residues.

13. The composition of claim 12 wherein the total number of alkylene oxide residues per poly(oxyalkylene) substituent is from 3 to 100.

14. The composition of claim 11 wherein less than 1 wt. % of the aqueous solvent comprises a water miscible, organic co-solvent and wherein the poly(oxyalkylene) substituent is a straight or branched chain of from 2 to 200 residues of $C_2$–$C_4$ alkylene oxides and 50% or greater of the alkylene oxide residues comprising the poly(oxyalkylene) substituent are ethylene oxide residues.

15. The composition of claim 14 wherein the total number of alkylene oxide residues per poly(oxyalkylene) substituent is from 4 to 50, the colorant has from 1 to 4 poly (oxyalkylene) substituents and the poly(oxyalkylene) substituents have a terminal group selected from the group consisting of hydroxyl and amine groups.

\* \* \* \* \*